J. B. WOLF & R. F. PARKS.
CHAIN LOCK AND TIGHTENER.
APPLICATION FILED APR. 12, 1916.
1,246,692.
Patented Nov. 13, 1917.
2 SHEETS—SHEET 2.
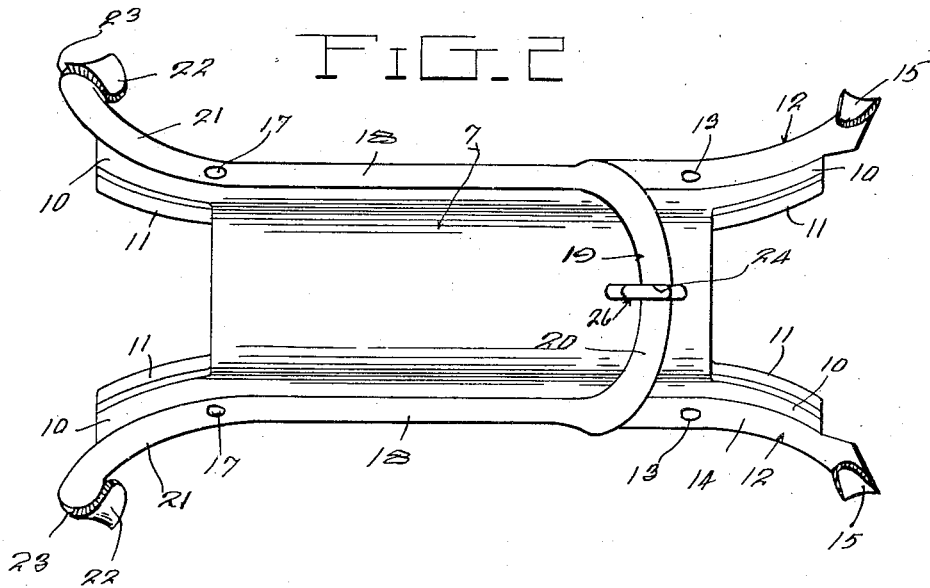
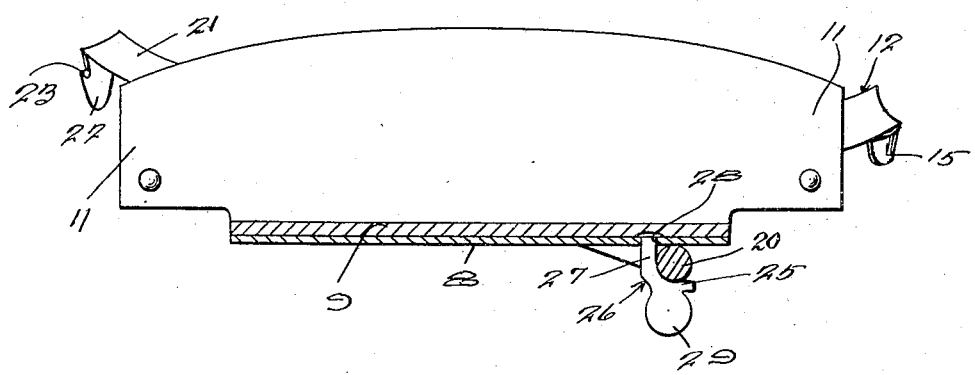

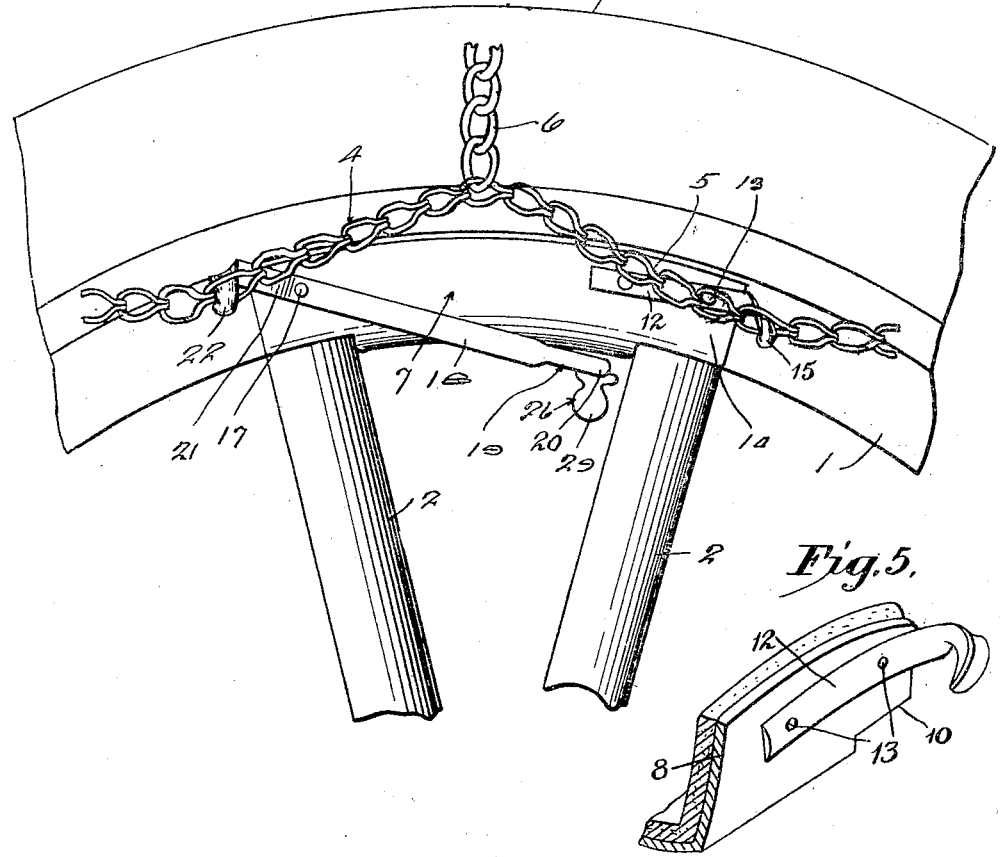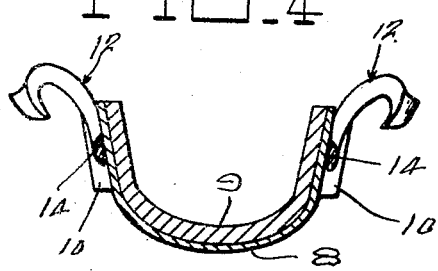

UNITED STATES PATENT OFFICE.

JOSEPH B. WOLF AND RAYMOND F. PARKS, OF MELROSE, IOWA.

CHAIN LOCK AND TIGHTENER.

1,246,692.     Specification of Letters Patent.     Patented Nov. 13, 1917.

Application filed April 12, 1916. Serial No. 90,663.

*To all whom it may concern:*

Be it known that we, JOSEPH B. WOLF and RAYMOND F. PARKS, citizens of the United States, residing at Melrose, in the county of Monroe and State of Iowa, have invented certain new and useful Improvements in Chain Locks and Tighteners; and we do hereby declare the following to be a full, clear, and exact description of the invention, such as will enable others skilled in the art to which it appertains to make and use the same.

This invention relates to new and useful improvements in chain locks and tighteners for non-skid chains of motor vehicles, and the principal object of the invention is to provide a device which will prevent the chains from slipping and causing wear upon the tires.

Another object of the invention is to provide a device which will effectively tighten the chains in place taking up all slack and locking the cross chains against movement.

A further object of the invention is to provide a device of the above nature, in which the main body portion seats between two of the spokes of the wheel so that movement of the device, on the wheel is prevented.

With these and other objects in view, the invention consists in the novel combination, and arrangement of parts which will be fully set forth in the following specification and accompanying drawing, in which:—

Figure 1 is a fragmentary side view of a wheel, showing this improved attachment applied thereto.

Fig. 2 is a plan view of the attachment.

Fig. 3 is a longitudinal sectional view through the device.

Fig. 4 is a transverse sectional view through the device, and

Fig. 5 is a detail perspective view of the end of one of the attaching arms to which the chain is secured.

Referring to the drawings by characters of reference, the numeral 1 designates the rim of a wheel of the usual construction provided with the ordinary spokes 2, and secured to the rim in the ordinary manner is the tire, designated by the numeral 3. The non-skid chain is designated generally by the numeral 4 and comprises the side chains 5, which are connected in parallel relation by the cross chains 6, which are shaped to conform to the contour of the tire and overlie the tread thereof, to form a gripping surface for the vehicle.

The attachment is designated generally by the numeral 7 and comprises the transversely U-shaped body 8 provided on its inner face with the shield 9 of leather or a similar relatively soft material. The body 8 is preferably of metal or similar material, and the side walls of the device are extended, as at 10, and these extended portions are bent outwardly and alined with the extensions 11 formed on the shield 9. Suitable connections, designated generally by the numeral 12, are riveted or otherwise secured, as at 13, to the body 8. Each of these connecting arms 12 comprises the longitudinally curved body 14 having the hook 15 formed at its end.

Pivoted at 17 to the opposite end of the body 8, are the arms 18 of the bail, designated generally by the numeral 19. These arms are connected at their rear ends by means of a bight portion 20 and the forward ends of the arms are bent outwardly, as at 21, and provided with the hooks 22, which are notched, as at 23.

The bight portion 20 of the bail 19 is provided with a notch 24 into which the extension 25 on the lock, designated generally by the numeral 26, seats. This lock comprises the extension 25 which is secured or formed integral with the post 27, which in turn is rotatably mounted in the opening 28 formed in the bight portion of the U-shaped body 8 near one end. A suitable thumbpiece 29 is formed on the arm 25 and provides a means by which the device may be operated.

It will be apparent upon reference to Fig. 1 that in use the device is connected to the links of the side chains as shown, and the bail is then moved inwardly so as to lie against the body 8 and in this position the button 29 is then turned, so that the extension 25 engages in the notch in the bail, and it will be apparent that the device will be locked in place. It will also be apparent that the chains can not slip on the wheel, and further are locked against longitudinal movement in both directions and it will thus be seen that the traction will be materially increased.

While in the foregoing there has been shown and described the preferred embodiment of this invention, it is to be understood that such changes may be made in the combination and arrangement of parts as will fall within the spirit and scope of the appended claim.

What is claimed is:—

In combination with a wheel provided with a tire and non-skid chains adapted to be attached to the wheel, a transversely U-shaped plate, arms rigidly secured on one end of the plate, hooks at the ends of the arms, a bail pivoted to the opposite end of the plate, hooks on the free ends of the arms of the bail, the hooks attached to the chains, and means swivelly carried by the plate to engage the bight portion of the bail to hold the bail in locked position.

In testimony whereof we affix our signatures in presence of two witnesses.

JOSEPH B. WOLF.
RAYMOND F. PARKS.

Witnesses:
FRED SHEPKE,
WALTER E. PARKS.

Copies of this patent may be obtained for five cents each, by addressing the "Commissioner of Patents, Washington, D. C."